No. 610,366. Patented Sept. 6, 1898.
J. H. McCORMICK.
CASH REGISTER AND INDICATOR.
(Application filed Oct. 6, 1894.)
(No Model.) 7 Sheets—Sheet 1.

Figure 1:
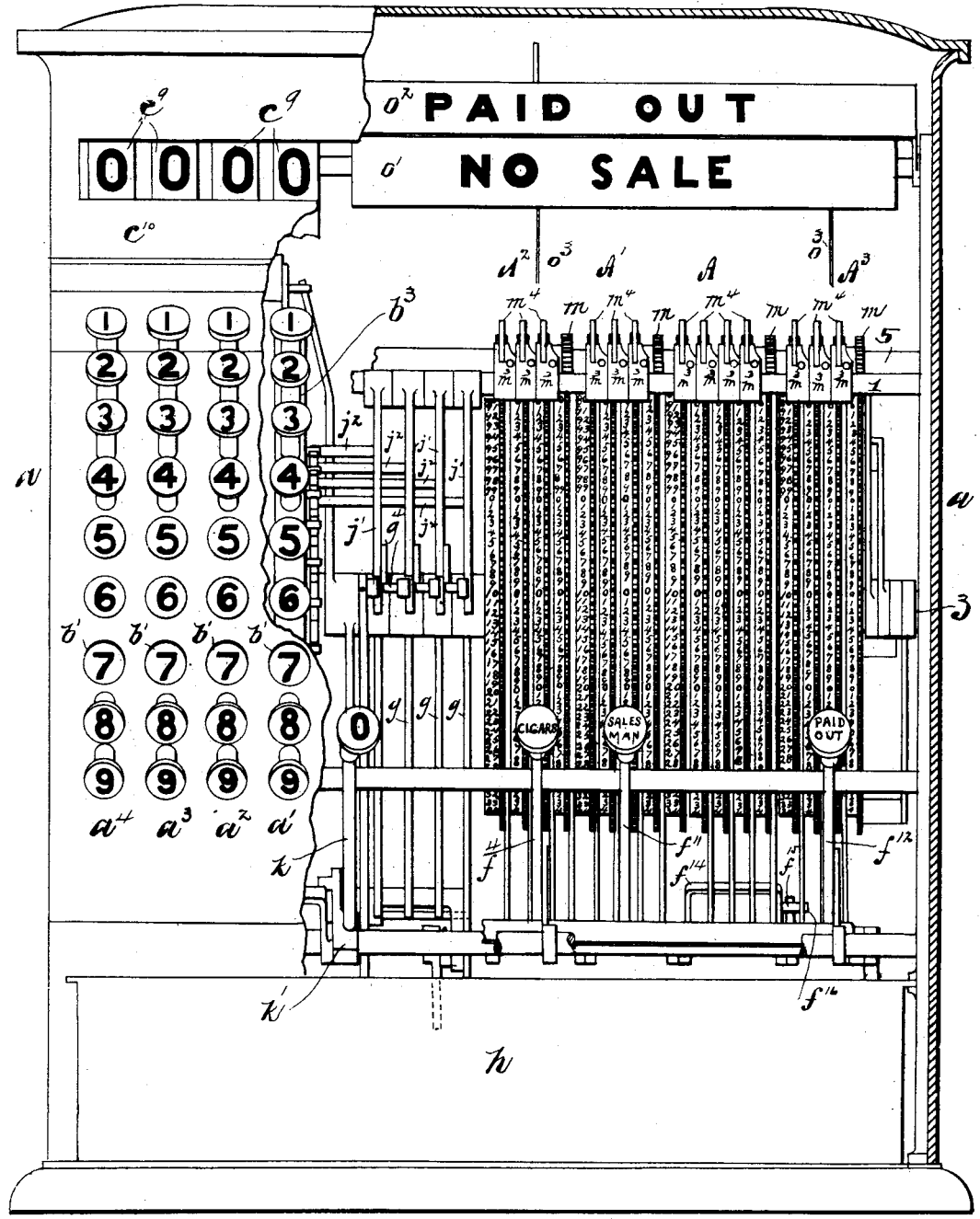

WITNESSES: *Fig. 1* INVENTOR
John H. McCormick
BY
ATTORNEYS

No. 610,366. Patented Sept. 6, 1898.
J. H. McCORMICK.
CASH REGISTER AND INDICATOR.
(Application filed Oct. 6, 1894.)
(No Model.) 7 Sheets—Sheet 4.

WITNESSES:
INVENTOR
John H. McCormick
BY
ATTORNEYS

No. 610,366. Patented Sept. 6, 1898.
J. H. McCORMICK.
CASH REGISTER AND INDICATOR.
(Application filed Oct. 6, 1894.)
(No Model.) 7 Sheets—Sheet 5.
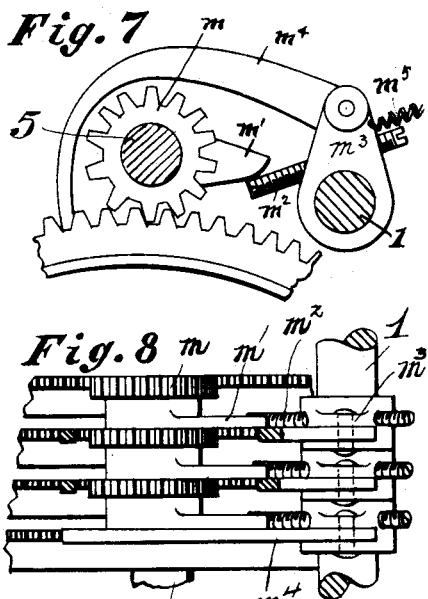
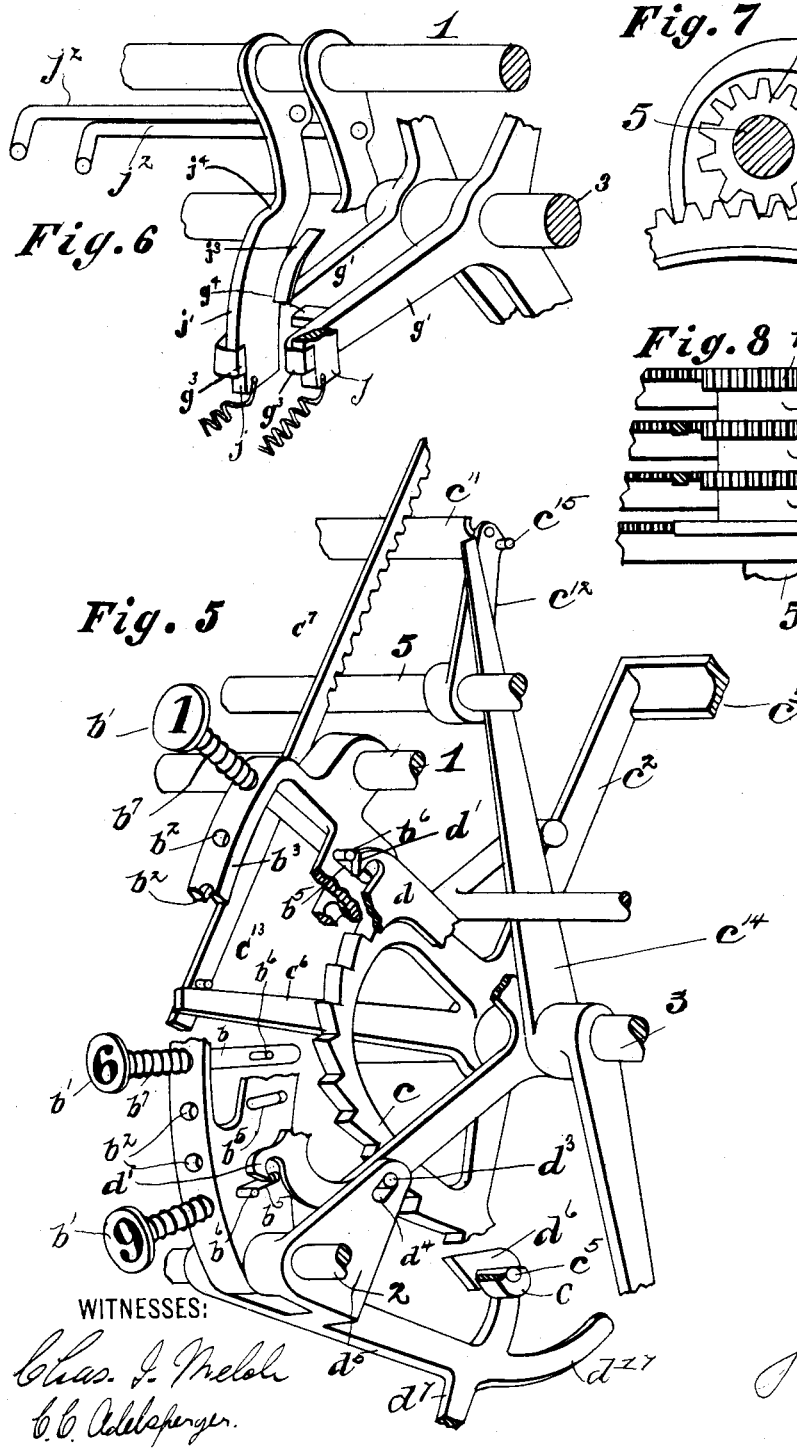

No. 610,366. Patented Sept. 6, 1898.
J. H. McCORMICK.
CASH REGISTER AND INDICATOR.
(Application filed Oct. 6, 1894.)
(No Model.) 7 Sheets—Sheet 6.
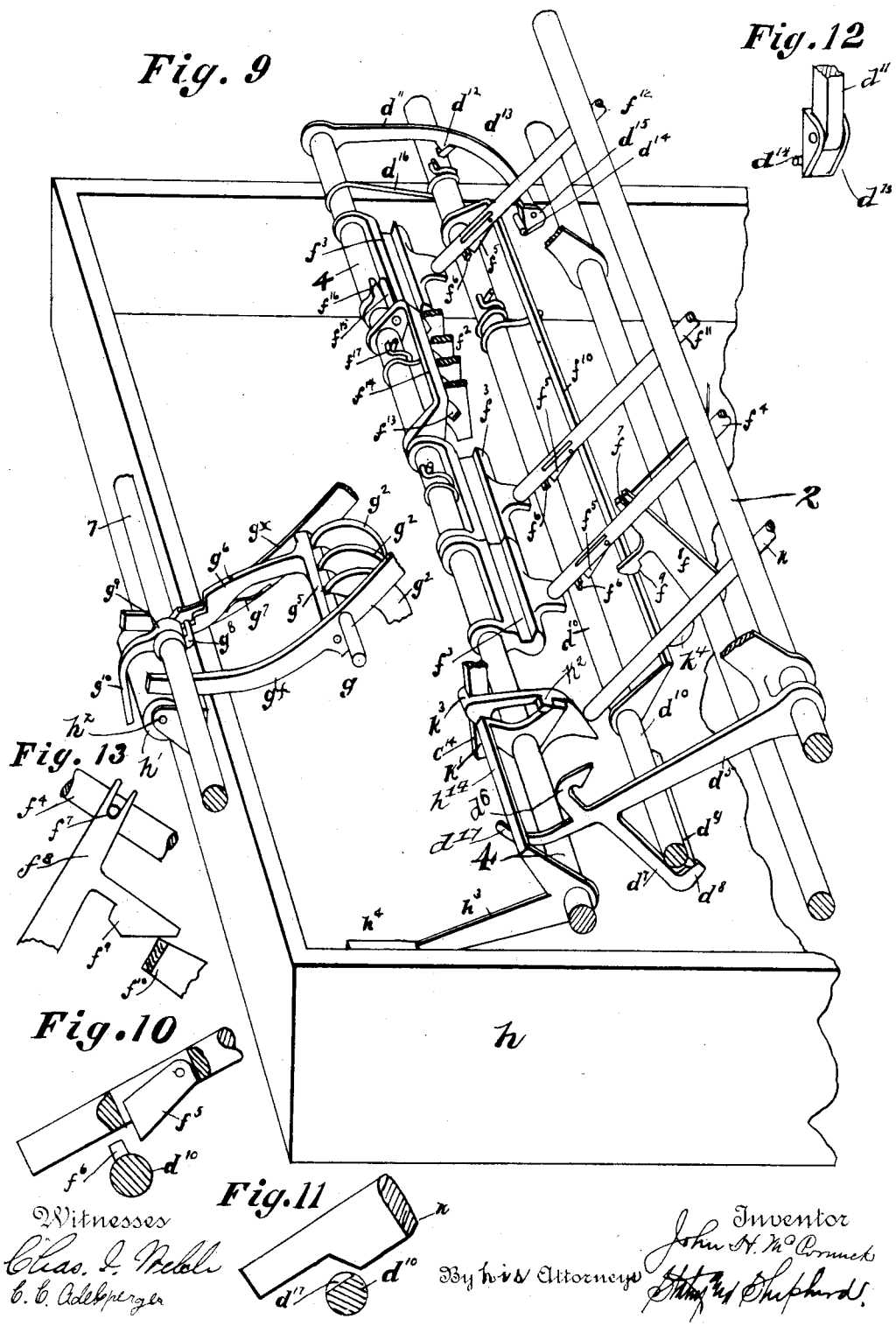

UNITED STATES PATENT OFFICE.

JOHN H. McCORMICK, OF COLUMBUS, OHIO, ASSIGNOR, BY MESNE ASSIGNMENTS, TO THE HALLWOOD CASH REGISTER COMPANY, OF OHIO.

CASH REGISTER AND INDICATOR.

SPECIFICATION forming part of Letters Patent No. 610,366, dated September 6, 1898.

Application filed October 6, 1894. Serial No. 525,185. (No model.)

*To all whom it may concern:*

Be it known that I, JOHN H. McCORMICK, a citizen of the United States, residing at Columbus, in the county of Franklin and State of Ohio, have invented certain new and useful Improvements in Cash Registers and Indicators, of which the following is a specification.

My invention relates to improvements in cash registers and indicators; and the object of my invention is to provide a cash-register by which transactions in different departments of any business may be registered separately, the construction being such that the total amount of all departments will also be registered.

A further object of my invention is to provide means by which individual accounts of different sales from employees may be registered at the same time the transaction is registered or recorded in the department to which it belongs.

A further object of my invention is to provide means by which various transactions not properly belonging in the total registration may be independently registered or recorded.

A further object of my invention is to provide means for indicating the character of the transaction when the same is being registered.

A further object of my invention is to improve on and simplify the construction of registers and indicators heretofore employed.

I attain these objects by the constructions shown in the accompanying drawings, in which—

Figure 2:
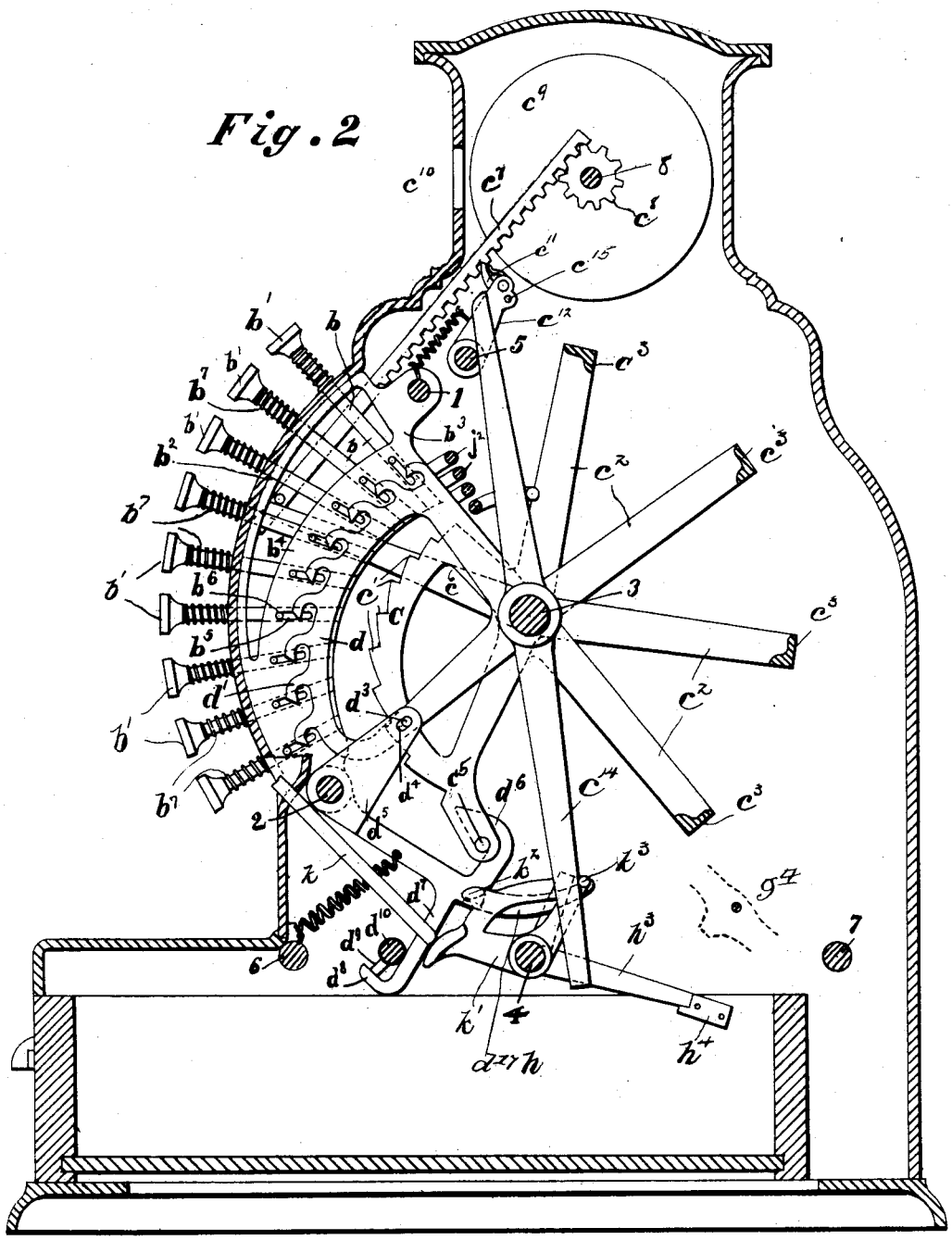
Figure 3:
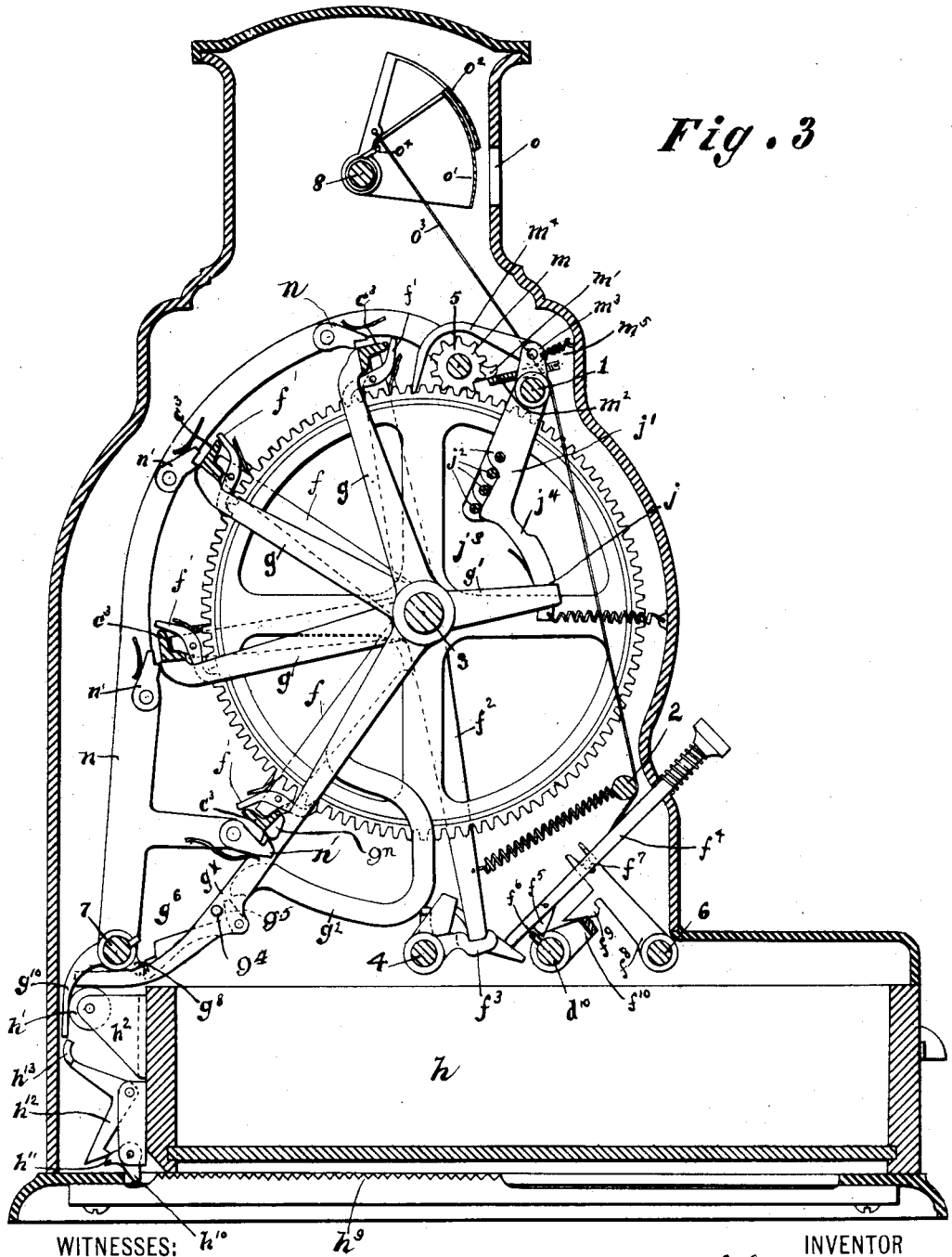
Figure 4:
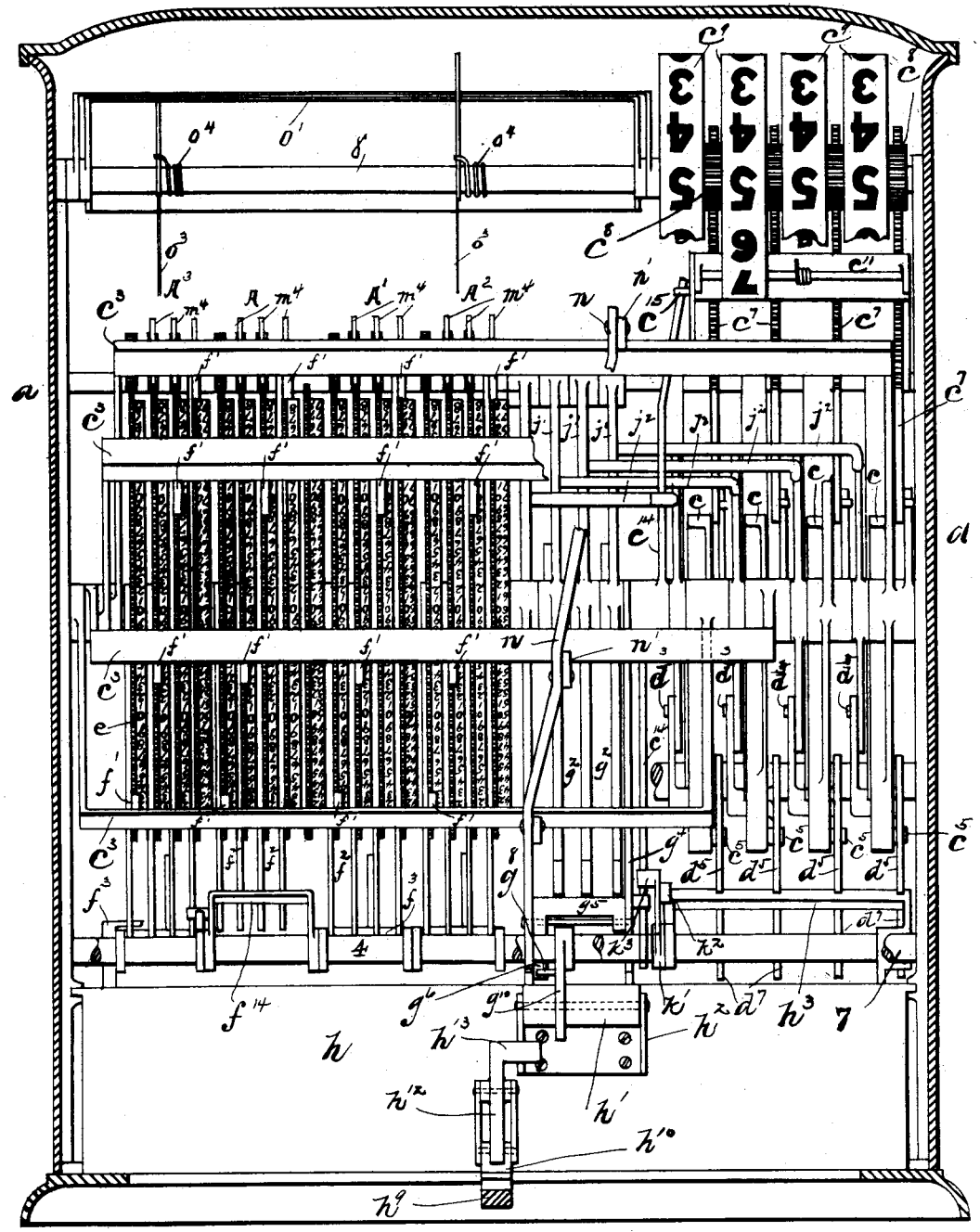
Figure 14:
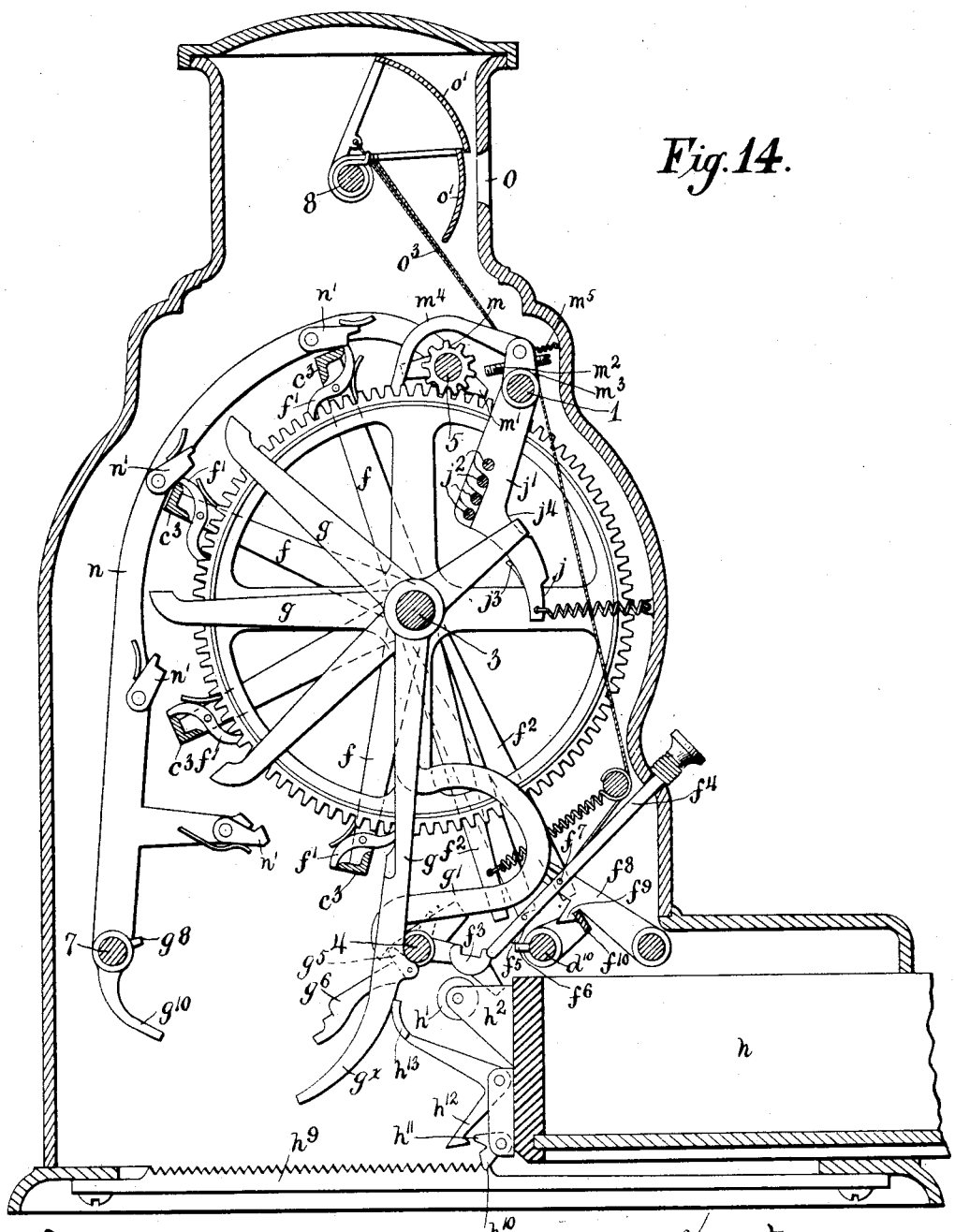

Figure 1 is a front elevation, partly broken away, of a device embodying my invention. Fig. 2 is a transverse sectional elevation of the same, looking toward the keyboard. Fig. 3 is a transverse sectional view looking in the opposite direction. Fig. 4 is a rear elevation, partly in section, with some of the parts broken away for perspicuity. Fig. 5 is a perspective view in detail of the keyboard and some of the connecting parts. Fig. 6 is a detail view in perspective of part of the registering devices. Figs. 7 and 8 are detail views of the adding or transferring mechanism. Fig. 9 is a perspective view illustrating some of the various parts connected with the department-registers and their connecting elements. Figs. 10 to 13 are details. Fig. 14 is a view corresponding to Fig. 3, showing the parts in the positions which they occupy after registration has taken place and while the cash-receptacle is open.

Like parts are represented by similar letters and figures of reference in the several views.

In carrying out my invention I employ a keyboard in which the keys are arranged in sets or series, the respective keys in each set or series being numbered from "1" to "9" and the keys of the different sets or series being employed for registering different denominations, such as dollars, dimes, and cents. This keyboard and its connecting mechanism in the present machine are substantially the same as those shown and described in my Letters Patent No. 570,141, granted October 27, 1896, as are also the indicating-wheels and their connections.

In the patent referred to the registration of the amounts indicated by the depression of a key was accomplished only when the cash-receptacle was opened. In the present machine the registration of certain amounts is accomplished independent of the opening of the cash-receptacle, though the opening and closing of the cash-receptacle are used for returning the various parts to their normal positions. Other means, however, may be employed for returning the parts to their normal positions, in which case the registration will be accomplished entirely independent of the opening and closing of the cash-receptacle.

The frame $a\,a$ is provided at one side with a keyboard having the keys arranged in series, as shown at $a'\,a^2\,a^3\,a^4$. The key-stems $b$, with the knobs or buttons $b'$, are slidingly mounted in bearings $b^2$ in the circular frame $b^3$, having a web or flange $b^4$, with slotted openings $b^5$, through which projections $b^6$ extend. A spring $b^7$ on each of the keys serves to hold them in their normal positions. A pivoted segment $d$, having beveled hook-shaped projections $d'$, lies adjacent to the flange $b^4$ and is connected to a bell-crank lever $d^5$ by a pin $d^3$, operating in a slotted opening $d^4$. A hook-shaped end $d^6$ of the bell-crank lever engages with the pin $c^5$ in the vibrating or swinging frame $c$, having the laterally-projecting bar $c^3$, which extends across the registering-wheels and concentric therewith, in the manner and for the purpose more fully described hereinafter, all the parts heretofore described being the same as used in the machine set forth in my said Letters Patent referred to and more fully described therein.

The bars $c^3$, which are connected to the respective frames $c$, form intermediate actuating devices which determine the amount to be registered, the position of these devices being determined by the key depressed in any series the same as in my said Letters Patent. Any number of registering devices may be employed mounted on the same shaft, any of said registering devices being adapted to register the amount indicated by the keys on the keyboard when said registering devices are thrown into active position, the amount so registered being determined by the position of the bars $c^3$.

In the present machine the cash-receptacle is normally locked by a locking-bar $h^3$, journaled on the shaft 4 and resting at one end against a stop $h^4$ on said receptacle. The receptacle may be unlocked by the depressing of any key in any series through the medium of one of the bell-crank levers $d^5$, which carry horns $d^{17}$, projecting beneath the lifting-bar $h^{14}$ of the locking-lever $h^4$, so that when either of said bell-crank levers is operated to release the actuating-frame the receptacle is also unlocked. To provide, however, for preventing any registration unless the amount so registered be included in one of the departments, means are provided by which the keys are normally locked and can only be unlocked by an operation which will place one of the department devices in condition to be operated. Each of the bell-crank levers $d^5$ is provided with a downwardly-extending arm $d^7$, having a hook-shaped end $d^8$, adapted in its normal position to contact with a projection $d^9$ on an oscillating shaft $d^{10}$. In the normal position this projection $d^9$ prevents any movement of the bell-crank lever $d^5$. By partially revolving the shaft $d^{10}$, however, this projection $d^9$ may be moved out of contact with the hook $d^8$ on said bell-crank lever, and thus permit the same to be moved by the operation of a key.

Each of the registering-wheels $e$ of each set or series forming a department is provided with a pawl-lever $f$, having thereon a pawl $f'$, which engages with the teeth of its registering-wheel, each pawl-lever being further provided with an arm $f^2$, normally in engagement with a pivoted latch $f^3$, adapted to be operated by a key $f^4$ in the manner described in my said Letters Patent. Inasmuch, however, as the main keyboard is normally locked means are provided on each of the department-keys by which the keys of the main keyboard are unlocked whenever a department-key is depressed. Means are further provided by which when a department-key is depressed it is retained in this position until another department-key is depressed. Each department-key $f^4$ is provided with a pivoted latch $f^5$, adapted, as the same is moved inwardly, to contact with a projection $f^6$ on the shaft $d^{10}$, and thus turn said shaft sufficiently to remove said projection $d^9$ from contact with the hook $d^8$ of the bell-crank lever $d^5$, and thus unlock the keyboard. Each department-key is further provided with a projection $f^7$, which engages in the bifurcated end of a pivoted lever $f^8$, having a hook-shaped projection $f^9$, adapted to engage with a swinging spring-actuated bar $f^{10}$, pivoted on the shaft $d^{10}$, the construction being such that when a department-key is depressed the spring-actuated bar $f^{10}$ will engage in the hook-shaped projection $f^9$ of the pivoted arm $f^8$, and thus retain the department-key and the latch in a depressed or unlocked condition, the construction being such that when any other department-key having a similar construction is depressed the bar $f^{10}$ will be moved by the hook-shaped projection $f^9$, which is beveled at one end for this purpose, and thus release the department-key before depressed. (See Figs. 3 and 9.)

The shaft $d^{10}$ when rotated to unlock the respective bell-crank levers and thus unlock the keyboard is held in this position by means of a pivoted lever $d^{11}$, journaled at one end on the frame-shaft 4 and provided with a beveled projection $d^{12}$, adapted to engage with a projection $d^{13}$ on said shaft, and thus hold the shaft in this position until the arm or lever $d^{11}$ is raised by the closing of the cash-receptacle, as hereinafter more fully described.

In the drawings (see Figs. 1 and 4) I have shown four sets of registering devices. Of these A represents the main or total registering device; $A^2$, a department registering device on which are registered the transactions relating to any particular department or class of merchandise. A' represents a salesman's or employee's registering device, in which all the transactions of any particular employee are registered. At $A^3$, I have shown a registering device adapted to record transactions out of the usual order, such as "cash paid out" and similar items which are not properly included in the total registration on the main or total registering device. It will be understood that these respective registering devices A' $A^2$ $A^3$ may be duplicated as many times as desired to suit the business with which the device is employed. The construction is such that all of those devices which are between the keyboard and the main or total registering device are added to and included in the registration on said main or total registering device, while those on the opposite side of said main or total registering device are not so included.

The devices for controlling the registering mechanism of a salesman or employee are substantially the same as those for a department, except that no means are provided for retaining the key which releases said devices when depressed, said key and the latch operated thereby being adapted to be returned to their normal positions as soon as the key is released. Such a key is shown at $f^{11}$ in Fig. 9. It is provided with a pivoted projection $f^5$, adapted to contact with a projection $f^6$ on the shaft $d^{10}$ and revolve said shaft in the same manner as a department-key. Means are thus provided by which, a department being in position for operation, a salesman or employee making a sale or desiring to register a transaction in said department, at the same time crediting himself for said transaction, simply presses a key corresponding to his registering device and operates the keyboard. In such case the amount so indicated on the keyboard is registered in the department to which it belongs on the registering device of the individual salesman and on the total or main registering device.

When it is desired to record a transaction on the registering devices to the right of the main or total registering device—such as "cash paid out," for instance—means are provided by which all the other departments are returned to their normal positions and locked, and the pawl-levers of the total or main registering device are also locked, so that the registration takes place only in the department released. The key $f^{12}$ in Fig. 9 indicates such a key. It is of the same construction and has the same connections as the key $f^4$, and it is adapted when depressed to operate the swinging bar $f^{10}$, and thus disengage all the other department-keys, and when so disengaged the respective latches $f^3$ belonging to said departments will retain the pawl-levers and prevent their operation. A depression of the key $f^{12}$ will also produce a partial rotation of the shaft $d^{10}$, so as to unlock the main keyboard and its connected devices. The projecting arms $f^2$ of the pawl-levers $f$ of the main registering device are each provided, near their lower extremities, with hook-shaped recesses $f^{13}$, which normally stand in line and are adapted to receive a swinging bar $f^{14}$. This swinging bar $f^{14}$ has at each end perforated arms, which are journaled on the frame-shaft 4, one of which is provided with a projection $f^{15}$, which rests in contact with a lug $f^{16}$ on the latch $f^3$ belonging to the "cash-paid-out" department operated by the key $f^{12}$. As said latch is moved, therefore, by the depression of the key $f^{12}$, the swinging bar $f^{14}$ is forced into the hook-shaped recesses $f^{13}$, and thus locks the pawl-levers of the main or total registering device and prevents any registration on said registering device whenever the key $f^{12}$ is depressed. A spring $f^{17}$ is adapted to hold the swinging bar $f^{14}$ in its normal position and return the same, so as to release the main registering-levers whenever the key $f^{12}$ is released.

It will be seen from the above description that means are provided by which the different departments may be operated, so that the amounts indicated on the keyboard may be registered thereon.

I shall now proceed to describe the devices for controlling the pawl or registering levers and for transferring amounts from one registering-wheel to the next succeeding one whenever a sufficient number of units of the lower denomination are registered to make a unit of the next higher.

Each of the bars $c^3$ is normally supported by an arm $g$, which is pivoted on the shaft 3 and is provided with a projecting finger $g'$, the bars $c^3$ corresponding to dimes, dollars, and tens of dollars being thus supported. As these arms $g$ form part of the means for controlling the pawl-levers and for returning these parts to normal positions, it will be seen that the cents-bar $c^3$ does not require an arm $g$, because these functions are served by the arm $g^\times$, which operates each time registration takes place. Each of these supports $g$ is further provided with a downwardly-extending arm $g^2$, which is engaged upon closing the receptacle, as will hereinafter appear, for returning the parts $g$ $g'$ $g^2$ to normal position, and each of which is curved outwardly and backwardly in a U shape, as shown in Fig. 3, to permit the proper movement of the lower bar $c^3$ of the series which corresponds to the cents denomination. Each of the fingers $g'$ is provided with a lateral projection $g^3$, adapted to engage in a notch or recess $j$, formed in the end of a hinged arm $j'$, there being one of these arms $j'$ for each finger $g'$. (See Fig. 6.) Each of the swinging arms $j'$ has a lateral projecting rod $j^2$, Figs. 1 and 2, each of which rests in contact with one of the swinging segments $d$, operated by the keys. A movement of either of said segments therefore produces a movement of the arm $j'$ corresponding to said segment. The swinging arms $j'$ are so constructed that a movement of the arm corresponding to the highest denomination will produce a movement of all the other arms, the arm corresponding to the highest denomination being adapted to contact with the rods $j^2$ of each of the others. Any one of said arms may move without moving the arm of the next higher denomination, but carries with it all those of a lower denomination. Each of the fingers $g'$, save the one corresponding to the highest denomination, has a projecting lug $g^4$, extending in the opposite direction from the projection $g^3$. Each of the arms $j'$, save the one of the lowest denomination, has a flange $j^3$, adapted, as said arm is swung inwardly, to engage with the projection $g^4$ of the next succeeding finger $g'$ and temporarily hold the said finger. This inward movement of the arm $j'$ of the highest denomination releases the finger $g'$ corresponding thereto and permits the support $g$ to drop. The arm $j'$ is formed on its outer periphery on the arc of a circle whose center, when the arm is pushed inwardly, will be at the center of the shaft 3, so that the projection $g^3$ of the finger $g'$ will travel on said peripheral portion and retain the arm in its inner position until said projection reaches a recess $j^4$ in said arm, when said arm will swing outwardly, so that the flange $j^3$ will be removed from the projection $g^4$ of the next succeeding finger and allow said finger to move correspondingly.

As has been described, each frame is released by pushing in one of the keys in the corresponding denomination or value series, said key engaging a hook $d'$ on segment $d$ and lifting hook $d^6$ of bell-crank lever $d^5$ out of engagement with pin $c^5$ on frame C, said segment $d$ immediately thereafter returning to normal position and bringing its hook $d^2$ into engagement with projection $b^6$ on key $b$; but since the supports $g$, which engage bars $c^3$ of frames C and which are themselves caused to move successively, will prevent the immediate movement of frames C it is necessary to provide against reëngagement of pins $c^5$ by hooks $d^6$. This is accomplished by permitting a slight lost motion between lug $g^4$ and cam $j^3$ sufficient to permit pin $c^5$ to pass just beyond the reach of hook $d^6$. Means are thus provided by which the respective supports $g$ are moved successively, that of the highest denomination moving first and the others following in successive order.

The bar $c^3$, corresponding to the cents denomination, is supported on a straight arm $g^\times$, which extends downwardly and is provided with a curved portion which rests in contact with a roller $h'$, journaled in a suitable bearing $h^2$ on the rear end of the cash-receptacle $h$. When any key is depressed, the cash-receptacle is unlocked, as before described, and is opened by a spring (not shown) in the usual manner, so that the arm $g^\times$, as well as the other supports $g$, fall when released by the swinging arms $j'$, as above described, and thus permit such bars $c^3$ as have been released by the operation of the keys to drop and with them the pawl-levers $f$, which have been released in the various departments.

In order to provide for transferring the amounts registered on one wheel to a succeeding wheel whenever the amount so registered is sufficient to make a unit of the next wheel, I employ in connection with each of the registering-wheels, except the one of the highest denomination, a pinion $m$, (see Figs. 1, 2, 7, and 8,) having teeth adapted to mesh in teeth in the registering-wheel, the number of teeth in the pinion corresponding to the number of units in one wheel necessary to produce a unit of the next succeeding wheel. Each of these pinions $m$ has an enlarged tooth or projection $m'$ at one side thereof adapted to contact with a lug or projection $m^2$ on a pivoted arm $m^3$, to which is pivoted a curved pawl-lever $m^4$, which engages with the teeth of the next succeeding wheel. These pinions $m$ are all journaled on the frame-shaft 5, and the vibrating arms $m^3$ are journaled on the frame-shaft 1. Whenever the pinion $m$ makes one revolution, the projection $m'$, contacting with the projection $m^2$, oscillates the arm $m^3$ and carries the pawl $m^4$ forward sufficiently to move its wheel one notch. I have shown the projection $m^2$ screw-threaded, so as to be adjustable in order to insure the exact movement of the arm $m^3$ and the pawl connected thereto to produce a movement of one notch only of the registering-wheel with which it engages. As soon as the projections $m'$ and $m^2$ are disengaged by the forward revolution of the pinion $m$ the arm $m^3$ is returned to its normal position by a spring $m^5$. When this form of transferring device is employed, it is necessary that the registering-wheels constituting one registering device be operated successively in order that the transferring from one wheel to another be accomplished at such time that no registration is taking place on the wheel to which such transfer is to be made. This is accomplished by the employment of the pivoted arms $j'$, before described, the operation of which insures successive operation of the registering devices from the highest denomination to the lowest in the event that the keys representing the amount to be registered are depressed simultaneously or in rapid succession from highest to lowest. The keys may, however, be depressed in reverse order—that is, by depressing the lowest key first—providing sufficient time is allowed to elapse to permit the registration of the amount indicated by said key before the next key is depressed, the depressing of a key of a higher denomination being prevented during the said registration by the flange $j^3$ on the arms $j'$, which would contact with the lug $g^4$ of the finger $g'$ while said arm is moving, and thus prevent the movement of the arm $j'$ and the keys controlled thereby until the lug $g^4$ has passed the flange $j^3$, after which the arm $j'$ corresponding to any key of a higher denomination may be operated, but in so operating carries with it all of the registering devices which are of a lower denomination and which have not already been operated by the depression of a key. It will be seen now that if a registration is made in a series of keys of a higher denomination—for instance, dollars—the supports for the actuating devices of all the lower denominations are released in successive order, because each of the lateral rods $j^2$ engages all of the swinging arms $j'$ below it, and each finger $g'$ of a higher denomination must complete its movement and permit its swinging arm $j'$ to move outward again before its flange $j^3$ will release the lug $g^4$ on the finger $g'$ of the next lower denomination.

To prevent any registration of a lower denomination after the registration of a higher denomination has been completed and before the mechanism has been again restored to normal position, I provide auxiliary holding devices adapted as the supporting-levers are released to engage with actuating-bars $c^3$ and sustain them in their normal positions until the supports $g$ have been returned. This is accomplished, as shown in Fig. 3, by providing a stationary curved bar or support $n$, extending from the frame-shaft 5 to the frame-shaft 7, and to this support are pivoted spring-actuated pawls $n'$, adapted to normally rest in contact with the ends of the supports $g$ or, in the case of the lowest denomination, with a projection $g^{11}$ on the arm $g^\times$. Now if the bars $c^3$ and the supports $g$ are released so as to fall simultaneously these pawls $n'$ will have no effect on the operation of the devices. In the event, however, that the supports $g$ are released first while the bars $c^3$ are still retained in their normal positions the spring-pawls will be pressed under said bars and retain them, and thus prevent any subsequent registration of a lower denomination until said supports have been returned to their normal positions, and thus press the pawls out of engagement with said bars.

Were it not for the pawls $n'$ on the curved bar or support $n$ it might be possible to make an additional registration after the drawer is opened, and thus defeat the object of the machine—that is to say, if by pressing in cash-keys in the dollar series the arm $f$ with its pawl $f'$ of the dollar series and the supporting-bar $c^3$ and support $g$ of said dollar series are permitted to fall to record the transaction there would be nothing to prevent pushing in keys thereafter which correspond to the dimes and cents series, so as to also release the arm $f$ and bar $c^3$ of said dimes and cents series; but since all of the supports $g$ are released by the registration in any denomination and all the pawls $n'$ are likewise permitted to move into engaging position it follows that unless a bar $c^3$ is released by the pushing in of corresponding cash-keys simultaneously with the first registration said bars $c^3$ cannot thereafter be released, for the pawls $n'$ will have moved beneath it.

All the supports $g$ must be so arranged that they may operate independently in order to effect the successive operation of registration, as above described. Means must be provided, however, for returning all of these parts to their normal positions. To accomplish this, the projecting arms $g^\times$ of the cents or lowest denomination are bifurcated (see Fig. 9) and extended, as before described, so as to rest in contact with the roller $h'$ on the cash-receptacle. Between the respective arms $g^\times$ is a pivoted bar $g^5$, having a projecting arm $g^6$, against which operates a spring $g^7$. When the cash-receptacle is closed, the arm $g^6$ is in contact with a lug $g^8$ on a sleeve $g^9$ on the frame-shaft 7, which locks the arm $g^6$ in such a position that the bar $g^5$ is out of engagement with the levers $g^2$ and permits them to drop independently of the arms $g^\times$ when released. The sleeve $g^9$ is further provided with a curved extension $g^{10}$, which extends backwardly and downwardly and rests in contact with the roller $h'$ on the cash-receptacle. When the cash-receptacle (see Fig. 9) is opened, the arms $g^\times$ fall. The bar $g^5$ is released and is moved by the spring $g^7$, so as to engage the ends of the respective levers $g^2$ and retain the same until the cash-receptacle is closed. In closing the roller $h'$ contacts with the projection $g^{10}$ and forces the lug $g^8$ in contact with the arm $g^6$, so as to turn the bar $g^5$ and release the levers $g^2$. The arm $g^6$ is provided with a series of notches or steps, so that as the lug $g^8$ is turned it comes successively in contact with the said steps and rests against the shoulder intervening between the same, and thus locks the respective parts in this position until the cash-receptacle in opening has traveled forwardly sufficiently to release the arm $g^\times$.

Arranged below the drawer or cash-receptacle $h$ is a series of ratchet-teeth $h^9$, adapted to be engaged as the drawer is opened by a pivoted pawl $h^{10}$. This pawl $h^{10}$ is provided with a lug $h^{11}$, which is engaged by a pivoted latch $h^{12}$ as the cash-receptacle moves outwardly, and thus holds said pawl in a position to engage said ratchet-teeth and prevent the cash-receptacle from being closed. The arms $g^\times$ are arranged in line with a cross-bar $h^{13}$ on said latch $h^{12}$ and when released so as to drop to the limit of their stroke contact with said bar $h^{13}$, and thus release the latch $h^{12}$ and permit the pawl $h^{10}$ to reverse and engage the ratchet-teeth $h^9$ in the opposite direction, so as to prevent the cash-receptacle from being again opened until entirely closed. This construction prevents the receptacle from being returned until the registration is completed by the dropping of the supports representing the lowest denomination, which must fall whenever the drawer opens.

Means are provided by which the drawer or cash-receptacle may be opened without affecting any of the registering devices, except that the indicating devices and the various departments are returned to their normal positions. This is effected through the operation of a key $k$ coming in contact with a triangular piece $k'$, having lugs $k^2$ $k^3$, adapted to operate the drawer-lock $h^3$ and the pivoted lever $c^{14}$, substantially in the manner described in my previous patent referred to. The key $k$ is further provided with a lug $k^4$, adapted to contact with the swinging bar $f^{10}$, and thus release all department-keys which may have been depressed.

The indicating mechanism in the present machine does not differ from such mechanism as described in my Letters Patent No. 570,141, before referred to. Such mechanism consists of the indicating-wheels $C^9$, their controlling-racks $C^7$, and retaining-bar $C^{11}$, pivoted in the swinging arms $C^{12}$, which are mounted to turn on the frame-shaft 5 and under control of the lever $C^{14}$, swinging upon frame-shaft 3 and having its lower end arranged to receive impact from a projection $g^4$ on the lower end of the arm $g^\times$ when said arm drops upon the opening of the receptacle, as will be understood upon reference to Figs. 2 and 14. The lever $C^{14}$ also engages lateral rod $j^2$ of the "cents-arm" $j'$, so that when the drawer is opened without registering any amount by depressing key $k$ the triangular piece $k'$ will rock lever $C^{14}$ through projection $k^3$, and said lever will press arm $j'$ inward and release the finger $g$ of the cents-support $g^\times$ and allow the latter to fall forward as the drawer opens and operates latch $h^{12}$, as before described.

In order to provide for indicating the condition of the machine for registering so far as it relates to the departments specified, I employ a series of indicators in the upper part of the casing and preferably at one side of the indicating-wheels. A slotted opening $o$ is formed in the casing at this point, and opposite this is a segmental plate $o'$, pivoted on the shaft 8, which supports the indicating-wheels. (See Figs. 1 and 3.) This segmental plate $o'$ is provided with letters or signs which indicate that the machine is in its normal condition. In the drawings this is indicated as supplied with the words "No sale." On the upper part of this plate are provided the words indicating any one of the series of departments—for instance, "Cigars," "Drugs," &c. Adjacent to this segmental plate $o'$ and hinged concentric therewith are one or more auxiliary plates $o^2$, having different signs indicating different departments. These various plates are connected by suitable flexible connections $o^3$ to the respective keys which operate the different departments, so that whenever any department-key is depressed the sign corresponding to that department is brought into view opposite the opening $o$. Whenever the key $k$ is depressed all the other department-keys are released, and the various indicators are returned to their normal positions by suitable springs $o^4$, provided for the purpose, leaving the words "No sale" on the indicator $o'$ opposite the opening $o$.

It should be stated that the pivoted latches $f^5$ permit the return of the various department-keys past the lugs $f^6$ without operating the shaft $d^{10}$. This shaft $d^{10}$ is permitted to return to its normal position by a pin $d^{14}$ on the cash-receptacle, which as said receptacle is opened passes by a pivoted latch $d^{15}$ on the arm $d^{11}$; but as said receptacle is closed it engages with said latch and raises the arm $d^{11}$ until it disengages the lug $d^{13}$ on the shaft $d^{10}$ and permits said shaft to be turned to its normal position by the spring $d^{16}$. (See Fig. 9.) The various bell-crank levers $d^5$ and the keys connected therewith are thus locked until again unlocked by the operation of some one of the various department-keys. If desired, the key $k$, which I term the "zero-key," may be constructed so as to lock all of the main keys in the operation thereof until such key is returned to its normal position. This may be accomplished, as shown in Fig. 11, by forming in the periphery of the shaft $d^{10}$ a transverse slot $d^{17}$ and having a straight portion $k^5$ on the key $k$ adapted to enter said slot and prevent the rotation of the shaft $d^{10}$ until said key $k$ is returned to its normal position.

It will be seen from the above description that a register is provided by which all transactions of an ordinary mercantile business may be recorded. At the same time the various items may be separated into such detail accounts as are desirable, by which the amount of any particular department or employee may be ascertained at a glance.

I have described in the foregoing specification many novel features of my invention which are not claimed herein, because said features constitute the subject-matter of claims in my copending application filed September 13, 1897, Serial No. 651,447.

Having thus described my invention, I claim—

1. In a cash-register, the combination with a series of cash-keys representing different amounts, and a series of department-keys, and locking means controlled by the department-keys to prevent registration by the cash-keys until a department-key is operated, substantially as specified.

2. In a cash-register, a series of registering-keys, means for normally locking the same, a series of normally inactive registering devices, and department-keys for throwing the same in an operative position so as to operate in connection with said registering department-keys, said special keys being connected to said locking means and adapted to unlock said registering department-keys whenever any of said special keys are operated, substantially as specified.

3. In a cash-register, a series of registering-keys, an intermediate operating device controlled thereby, and a series of normally inactive registering devices, department-keys to control said registering devices, and a locking device for said registering-keys adapted to be operated to unlock said registering-keys when one of the department-keys is operated, substantially as specified.

4. In a cash-register, a series of registering-keys representing different amounts, a series of special keys, and locking means controlled by the special keys to prevent the operation of the registering-keys until a special key has been operated, and connecting devices between said special keys, adapted, when one of said special keys is operated, to return the other special keys to their normal positions, substantially as specified.

In testimony whereof I have hereunto set my hand this 18th day of September, A. D. 1894.

JOHN H. McCORMICK.

Witnesses:
 ROBERT C. RODGERS,
 CHAS. I. WELCH.